(12) United States Patent
Schapira

(10) Patent No.: US 9,052,754 B2
(45) Date of Patent: Jun. 9, 2015

(54) COMPUTER MOUSE ORIENTED TO DISABLED PEOPLE OR WITH MOVEMENT DISORDERS

(71) Applicant: Felipe Sergio Schapira, Ciudad de Buenos Aires (AR)

(72) Inventor: Felipe Sergio Schapira, Ciudad de Buenos Aires (AR)

( * ) Notice: Subject to any disclaimer, the term of this patent is extended or adjusted under 35 U.S.C. 154(b) by 0 days.

(21) Appl. No.: 13/846,831

(22) Filed: Mar. 18, 2013

(65) Prior Publication Data

US 2014/0043235 A1   Feb. 13, 2014

Related U.S. Application Data

(60) Provisional application No. 61/680,820, filed on Aug. 8, 2012.

(51) Int. Cl.
| | |
|---|---|
| *G09G 5/00* | (2006.01) |
| *G06F 3/0354* | (2013.01) |
| *G06F 3/02* | (2006.01) |
| *G06F 3/023* | (2006.01) |
| *G06F 3/038* | (2013.01) |

(52) U.S. Cl.
CPC .......... *G06F 3/03543* (2013.01); *G06F 3/0219* (2013.01); *G06F 3/023* (2013.01); *G06F 3/038* (2013.01)

(58) Field of Classification Search
CPC ..... G06F 1/1616; G06F 1/1656; G06F 1/169; G06F 3/0208; G06F 3/03543; G06F 3/0219; G06F 3/023; G06F 3/038; H01H 2003/0293
USPC ............. 361/679.01, 752, 796; 345/156, 163, 345/169; 348/734; 437/37
See application file for complete search history.

(56) References Cited

U.S. PATENT DOCUMENTS

| 1,959,160 | A | * | 5/1934 | Greenup .......................... 521/64 |
|---|---|---|---|---|
| 5,689,253 | A | * | 11/1997 | Hargreaves et al. ............ 341/22 |
| 7,001,088 | B2 | * | 2/2006 | Hui-hu ........................... 400/681 |
| 7,983,057 | B2 | * | 7/2011 | Zheng et al. ................... 361/810 |
| 8,102,644 | B2 | * | 1/2012 | Arita ......................... 361/679.01 |
| 8,248,810 | B2 | * | 8/2012 | Arita ............................. 361/752 |
| 8,355,004 | B2 | * | 1/2013 | Sato et al. ..................... 345/170 |
| 8,603,032 | B2 | * | 12/2013 | Cheney et al. ................ 604/151 |
| 2005/0254875 | A1 | * | 11/2005 | Hui-hu ........................... 400/472 |
| 2005/0258981 | A1 | * | 11/2005 | Graham et al. ................. 341/22 |

(Continued)

FOREIGN PATENT DOCUMENTS

EP             2 437 140 A1     4/2012

*Primary Examiner* — Lun-Yi Lao
*Assistant Examiner* — Peter D McLoone
(74) *Attorney, Agent, or Firm* — Blakely Sokoloff Taylor & Zafman

(57) ABSTRACT

The preferred embodiment of the invention describes a pointing device comprising a cabinet divided in two housings screwed together. Below the upper housing, a flexible, hard-use film contains all button symbols printed thereon and aligned with the housing upper side holes and tact switch actuators.

A high-relief surface defines the visible surface of depressed buttons surrounded by restraining circular walls which arise from said high-relief surface.

All buttons are placed in a bas-relief surface to avoid undesired or unintended pressings. Moreover, the fact that they are in a depressed surface help people with limb movement disorders to avoid the involuntary movement of their fingers beyond the limits of the depressed buttons, which act as restraining areas, thus avoiding to click, press or hold an undesired button.

6 Claims, 8 Drawing Sheets

(56) References Cited

U.S. PATENT DOCUMENTS

2009/0267892 A1* 10/2009 Faubert .................. 345/156
2009/0323262 A1* 12/2009 Arita .................. 361/679.01
2010/0046179 A1* 2/2010 Arita .................. 361/752
2010/0254078 A1* 10/2010 Zheng et al. .......... 361/679.02
2011/0102325 A1* 5/2011 Sato et al. .................. 345/168
2012/0092264 A1* 4/2012 Cheney et al. .................. 345/169

* cited by examiner

COMPUTER MOUSE ORIENTED TO DISABLED PEOPLE OR WITH MOVEMENT DISORDERS

FIELD OF THE INVENTION

The invention generally pertains to a computer mouse, and more particularly to a computer mouse oriented to disabled people or with movement disorders.

BACKGROUND

The pointing device, usually known as a mouse, has such a configuration that it is necessary for the user to have a minimum movement ability to be able to use it. People with movement disorders, Parkinson's disease, limb involuntary movements or attention deficit disorders may encounter serious difficulties or even face the absolute impossibility of using the mouse, since they cannot perform habitual actions, such as double click.

Certain devices in the prior art have tried to solve this problem by having access to the computer by the keyboard. However, the traditional keyboard can also turn out to be an insurmountable barrier to people with the abovementioned conditions. Afterwards, there were attempts in the prior art to replace the keyboard and the mouse with switchboards that functioned with special software enabling this particular access mode to the PC. Nevertheless, these softwares were expensive to design and implement, thus restraining the possibility of use to a particular sector with purchasing capacity, and depriving access to communicational and educational opportunities to the rest of the population with movement disorders.

Other more recent solutions aim at replacing the mouse with voice recognition devices. Furthermore, there are state-of-the-art devices which, dispensing with the mouse, allow a quadriplegic user to move the cursor on the screen using the mouth, tongue or even the movement of the eyes.

All these embodiments are highly complex, employ state-of-the-art technology, and are very expensive. None of the known solutions provide a simple, inexpensive and easy-to-assemble mouse with few components, which can effectively help people with the abovementioned physical disorders to use the computing tools as easily and directly as possible without making their limitations turn into an obstacle or impediment to have access to information.

BRIEF DESCRIPTION OF THE DRAWINGS

The following description includes discussion of figures having illustrations given by way of example of implementations of embodiments of the invention. The drawings should be understood by way of example, and not by way of limitation.

Descriptions of certain details and implementations follow, including a brief description of the figures, and a more detailed description with reference to the drawings.

DESCRIPTION

The preferred embodiment of the invention describes a pointing device, usually known as mouse, to enter commands to computers, which is designed to allow people with different types of movement disorders and disability degrees to employ computers and software. The claimed invention also allows the disabled user, for example, to select objects by means of a cursor or the like with the same possibilities as if using a regular pointing device. The buttons of the device are specially designed to allow an easy, simple and comfortable handling of the device given their large size and particular bas-relief configuration. This pointing device is also useful for people suffering from hand weakness and poor gripping, since they do not need to hold firmly the mouse; i.e. they can carry out the same activities just by clicking the buttons only once.

In addition, the particular configuration of the device and the large size of its buttons allow users to employ it with both hands, resembling a traditional keyboard and balancing the functions to be performed with both hands. In this sense, this particular feature is also useful for people suffering from Carpal tunnel syndrome releasing the burden of performing mouse functions with a single hand; the buttons can be clicked or pressed by resting the palm of both hands on the desk and the fingers on the pointing device.

Figure 1:
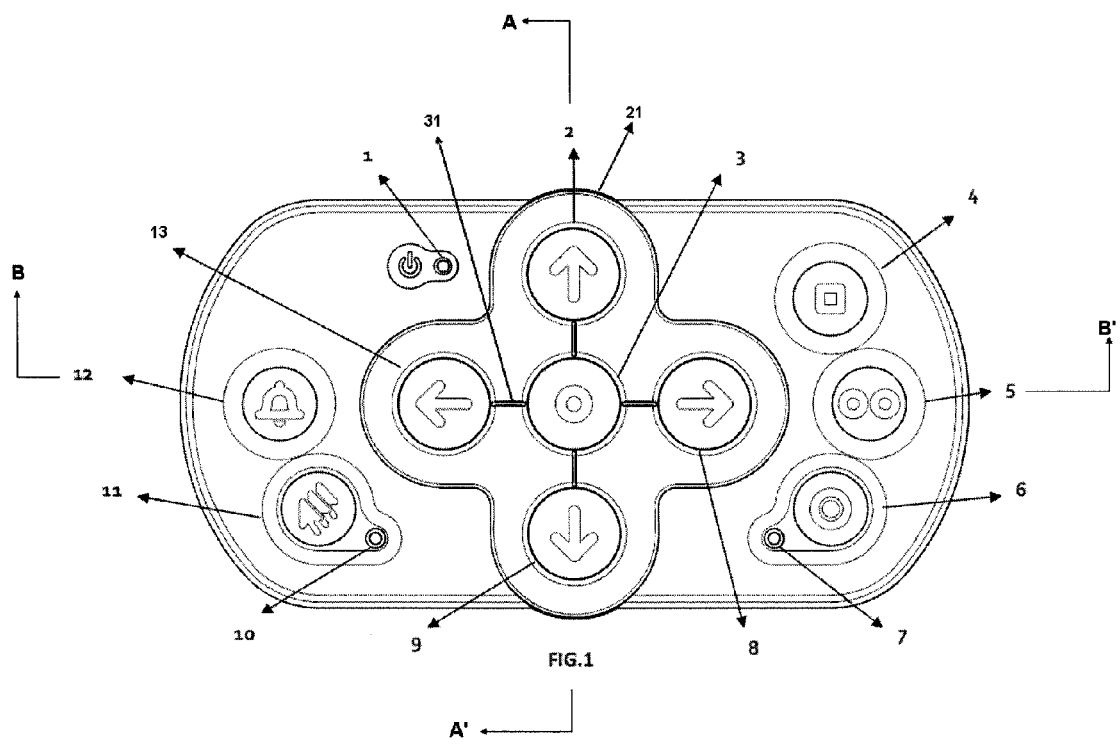
FIG. 1 illustrates a pointing device top view according to the preferred embodiment of the invention.

FIG. 1 illustrates a pointing device top view according to the preferred embodiment of the invention showing a user interface composed by ten action buttons, which offer a soft touch and a haptic feedback. The buttons of the preferred embodiment have different colors and are divided in two groups according to their function: movement buttons and operation buttons. The different colors assigned to each group allow a fast recognition and have a simple design as guidance for the user when clicking or pressing the right button.

All buttons are placed in a bas-relief surface to avoid undesired or unintended pressings. Moreover, the fact that they are in a depressed surface help people with limb movement disorders to avoid the involuntary movement of their fingers beyond the limits of the depressed buttons, which act as restraining areas, thus avoiding to click, press or hold an undesired button.

Figure 6:
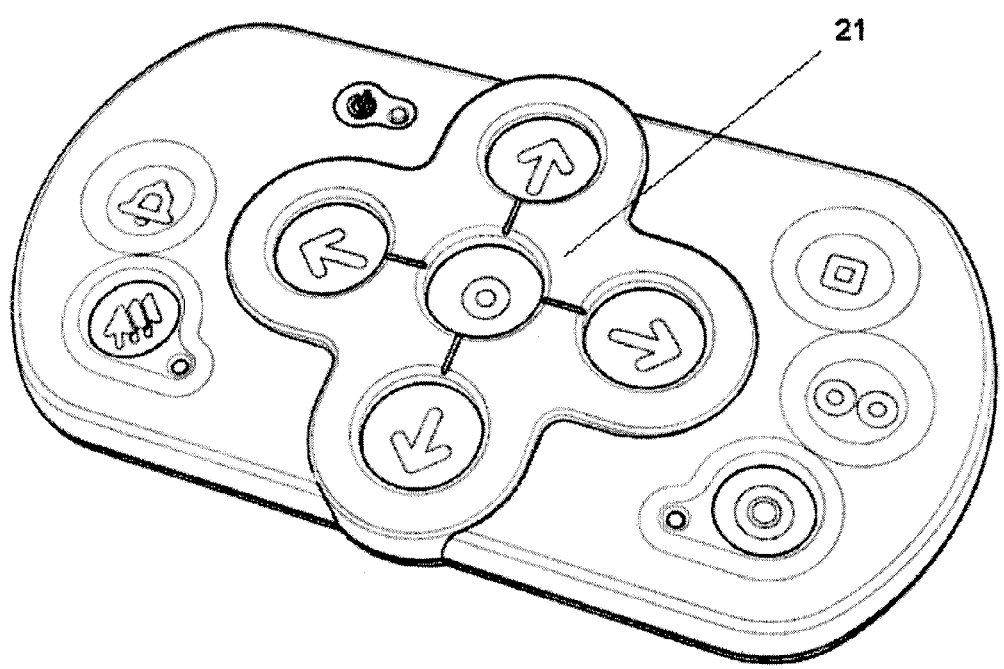
FIG. 6 illustrated a perspective view of a pointing device according to the preferred embodiment of the invention.

The movement buttons are four and set the cursor movement direction. The buttons are button 2 to move up, button 9 to move down, button 8 to move right, and button 13 to move left. These movement buttons are located strategically surrounded by a high-relief surface 21 for guidance, as can be seen in FIG. 6. The high-relief surface 21 is placed in the center of the upper housing and has a cross-shaped configuration. Said high-relief surface 21 including the four movement buttons and the left-click button comprises four grooves 31, two vertical ones and two horizontal ones, the imaginary axis intersection of which would cross in the barycenter of the central button 3. Those grooves 31 allow the user to tactically locate the positions of the fingers without it being necessary to look at the pointing device. These grooves 31 serve the same function as the high-relief lines usually found in traditional keyboards (i.e. in letters F and J) for hand positioning.

The operation buttons are six, divided in basic and advanced functions. The basic ones are button 3 to perform single left click, and button 4 to perform a single right click. Meanwhile the advanced ones are button 5 to perform a double left click, button 6 to perform a left click hold, button 11 for speed selection, and button 12 for assistance request.

Figure 2:
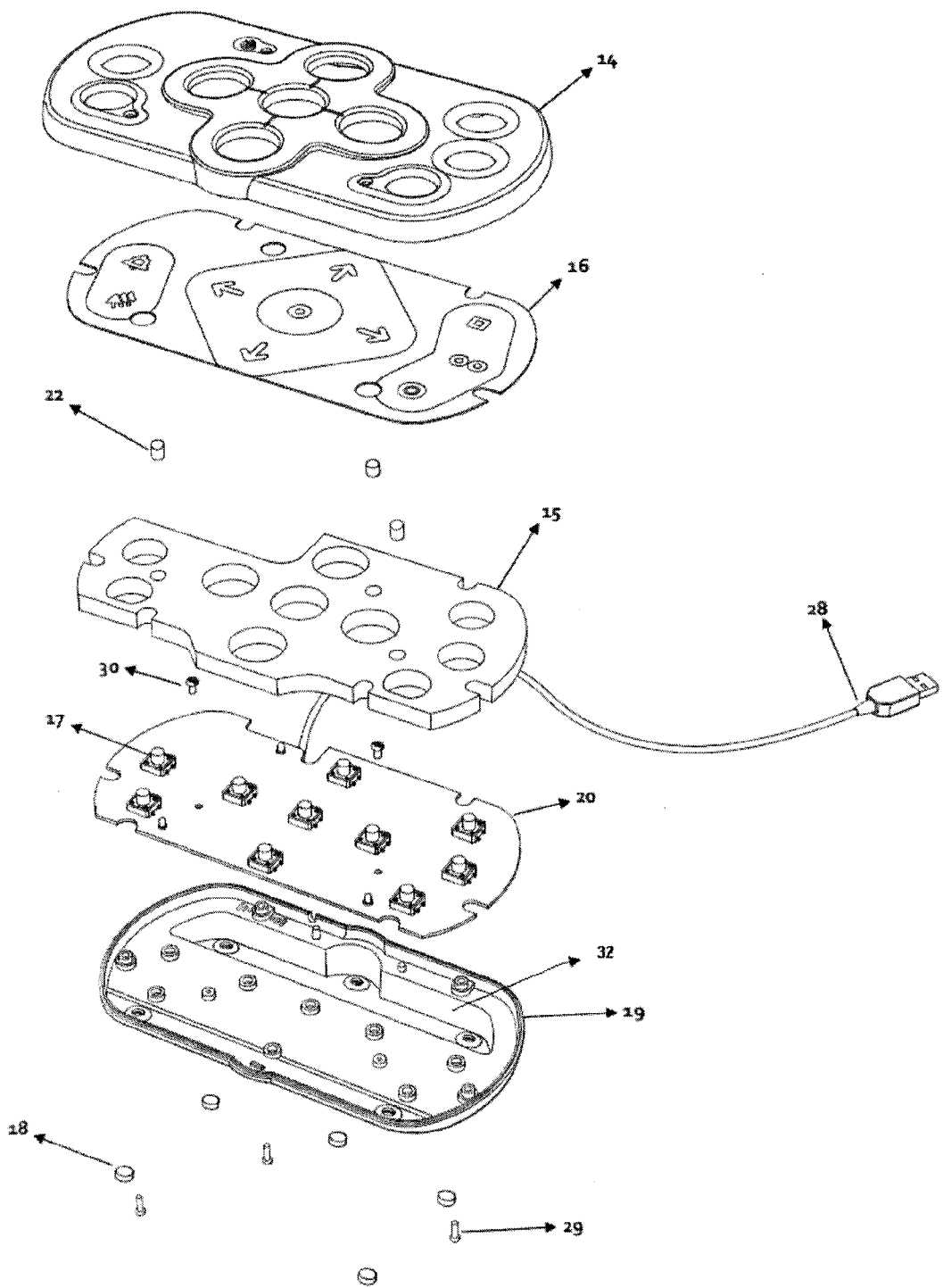
FIG. 2 is an exploded perspective of a pointing device according to the preferred embodiment of the invention.

FIG. 2 is an exploded perspective of a pointing device according to the preferred embodiment of the invention showing the device composed by an injected ABS or the like cabinet divided in two housings, an upper housing 14 and a lower housing 19. Both housings are screwed together. The preferred embodiment of the pointing device comprises, below the upper housing 14, a flexible, hard-use film 16, preferably made of polyester or the like. This film 16 contains all button symbols printed and aligned with the housing upper side holes and tact switch actuators.

Below the film 16 and above the printed circuit board 20, there is a microporous rubber 15. Said rubber 15 functions as filler between the PCB 20 and the lower side of the upper housing 14 to support the pressure exerted by the fingers. Additionally, the filler rubber 15 prevents the film 16 from moving off from the upper housing 14. The preferred embodiment also comprises three hard rubber separators 22 in order to avoid an accidental pushing of any button caused by a torsion provoked by the unintentional pressing of the upper housing 14, as it can be seen in the exploded perspective view of FIG. 2. In an alternative embodiment, these separators 22 may be configured as built-in separators protruding from the lower side of the upper housing 14, instead of being single removable pieces, thus making the assembly of the device easier.

The PCB 20 contains ten tact switches 17 which coincide with each of the abovementioned buttons. Moreover, said PCB 20 comprises three LED lights, red 25, blue 26, and green 27, as can also be seen in FIG. 7, the functions of which will be described hereinbelow. As regards FIG. 2, the exploded perspective view shows the lower housing 19 comprising a series of hollow protuberances for screwing both housings with screws 29, which also fit with the inlet, thus avoiding the movement or sliding of the PCB 20. In addition, the lower housing 19 of the preferred embodiment of the invention comprises a series of circular hollow protuberances arranged in line, approximately along the middle longitudinal axis. Said protuberances reinforce the lower housing thus avoiding the effects of an undue pressure thereon, which could bend the housing causing it to finally break. Alternatively, the lower housing may comprise two other small protuberances in order to further screw the PCB 20 to the lower housing 19 through the holes 33. This feature is not essentially necessary, but it may be used if deemed appropriate. On the bottom side of the lower housing 19, there are five anti-sliding pads 18 strategically placed.

Figure 3:
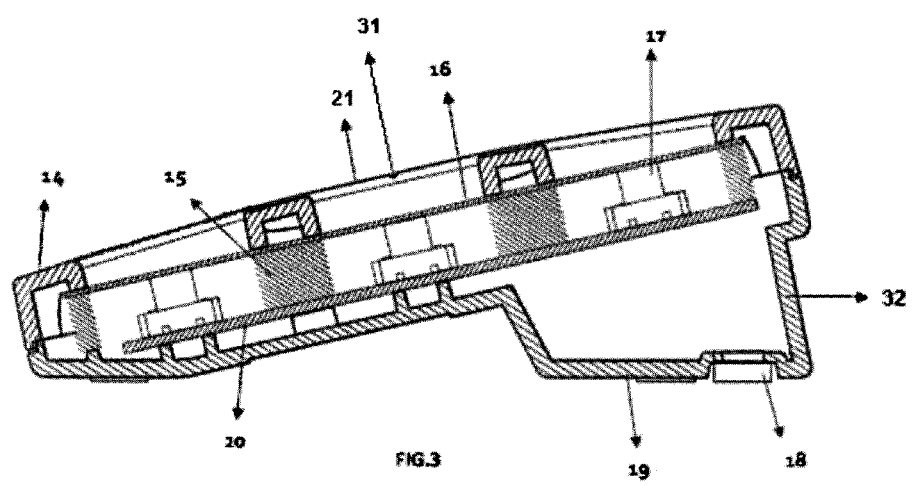
FIG. 3 illustrates a cross-section view A-A' of a pointing device according to the preferred embodiment of the invention.

FIG. 3 illustrates a cross-section view according to the vertical axis A-A' as shown in FIG. 1. In the preferred embodiment, the pointing device has an ergonomic design with a slight inclination to allow a comfortable use and an easy positioning, thus also minimizing the involuntary movement of the hand. As it can be seen in FIG. 3, the tact switches 17 are arranged along the PCB 20 conveniently fixed to the housings 14/19. The free spaces between the tact switches 17 are filled with the microporous punched rubber 15, and the flexible hard-use film 16 is placed above them. FIG. 3 clearly illustrates the visible surface 16 of the buttons and the high-relief surface 21 defining one of the most remarkable features of this invention, which is the depressed buttons surrounded by restraining circular walls which arise from the depressed surface 16 to the high-relief surface 21.

FIG. 3 also illustrates the inclination degree of the device trough a hollow back support 32 disposed along the device. This hollow back support 32, in addition to provide inclination to the mouse, also serves to contain the elements which protrude from the lower surface of the PCB 20, e.g. buzzer 24. Said back support 32 has a height and width such that the elements can easily fit therein without the risk of being damaged by the rubbing or touching with other surfaces.

FIG. 3 also illustrates how the anti-sliding pads 18 fit within the cavity disposed to such end in the plastic housing lower side 19.

Figure 4:
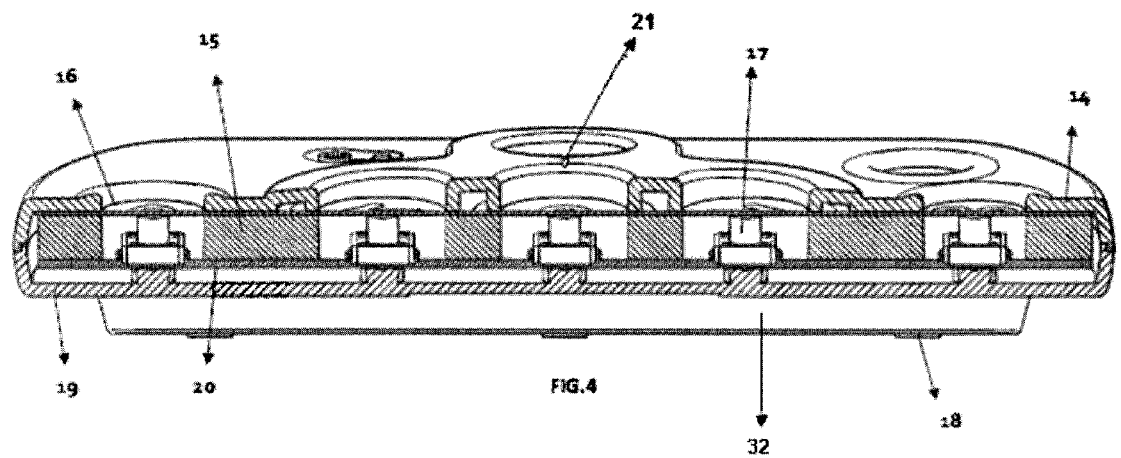
FIG. 4 is a cross-section view B-B' of a pointing device according to the preferred embodiment of the invention.

FIG. 4 illustrates a cross-section view according to the horizontal axis B-B' as shown in FIG. 1, showing the same features of the pointing device as in FIG. 3 but from a frontal view.

Figure 5:
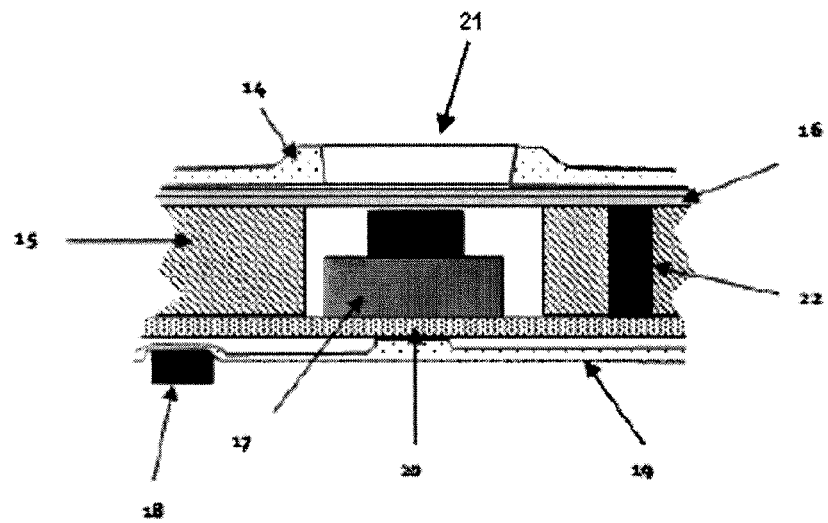
FIG. 5 illustrates an enlarged cross-section view of a portion of a pointing device according to the preferred embodiment of the invention.

FIG. 5 illustrates an enlarged cross-section view of a portion of a pointing device according to the preferred embodiment of the invention, showing in detail the interaction between the tact switch 17, the PCB 20, and the flexible hard-use film 16. To guarantee that the microporous punched rubber is not unduly or unintentionally smashed, the hard rubber separator 22 provides rigidity between the film 16 and the PCB 20.

Figure 7:
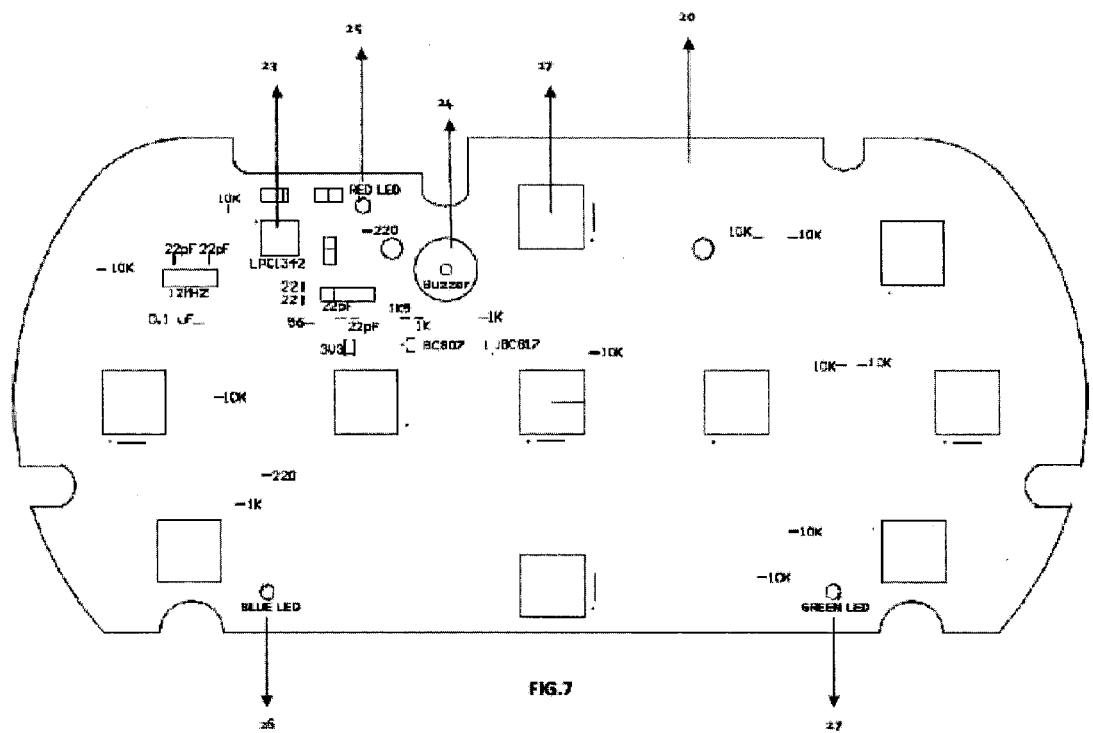
FIG. 7 illustrates the PCB with components of a pointing device according to the preferred embodiment of the invention.
Figure 8:
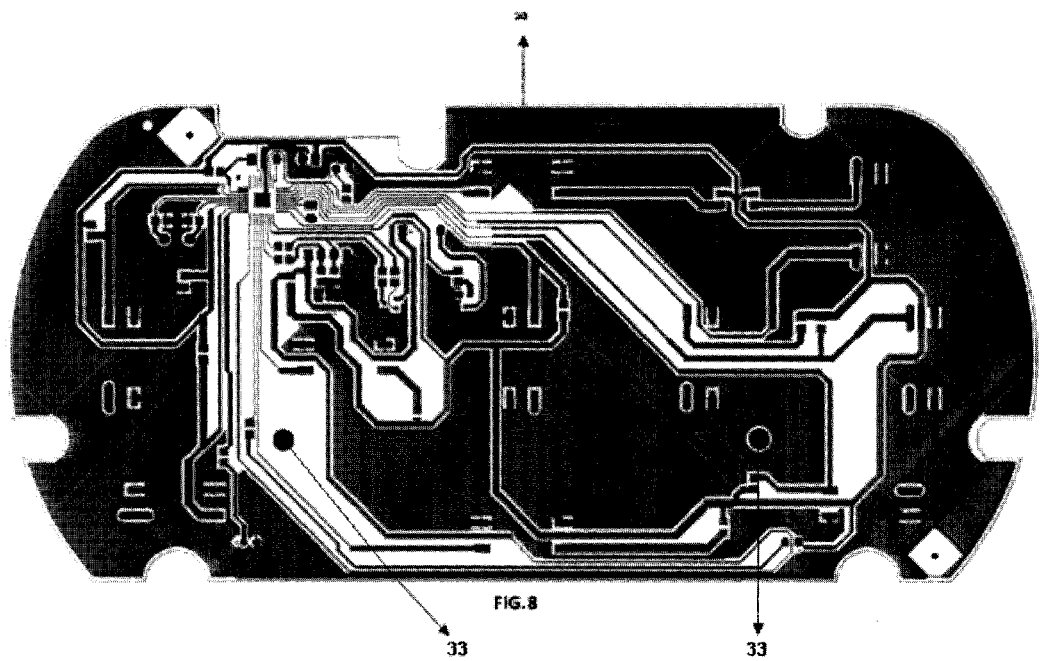
FIG. 8 illustrates the PCB with tracks or pathways of a pointing device according to the preferred embodiment of the invention.

FIG. 7 illustrates the PCB with components, and FIG. 8 illustrates the PCB with tracks or pathways of a pointing device according to the preferred embodiment of the invention, wherein the circuit is composed by one Microcontroller (MCU), ten push-button "tact switch" kind 17, one buzzer 24, one NPN transistor, one PNP transistor, 3 LED's (one red 25, one blue 26, and one green 27), one USB cable connector, one USB cable with USB A male connector 28 as external terminal, one crystal clock, one zener diode and diverse resistors and capacitors. All these electronics components are assembled over the printed circuit board 20. In the preferred embodiment, the device comprises a USB data/supply connection which provides HMID (Human Machine Interface Device) compatible device requirements. The device is supplied power through the USB Bus. In order to obtain a 3.3 V voltage, a zener diode (D4), a resistor (R20) and a capacitor (CS) are employed. This voltage is used to feed the rest of the circuit. data/supply connection which provides HMID (Human Machine Interface Device) compatible device requirements. The device is supplied through the USB Bus. In order to obtain a 3.3 V voltage, a zenner diode (D4), a resistor (R20) and a capacitor (C5) are employed. This voltage is used to feed the rest of the circuit.

Figure 9:
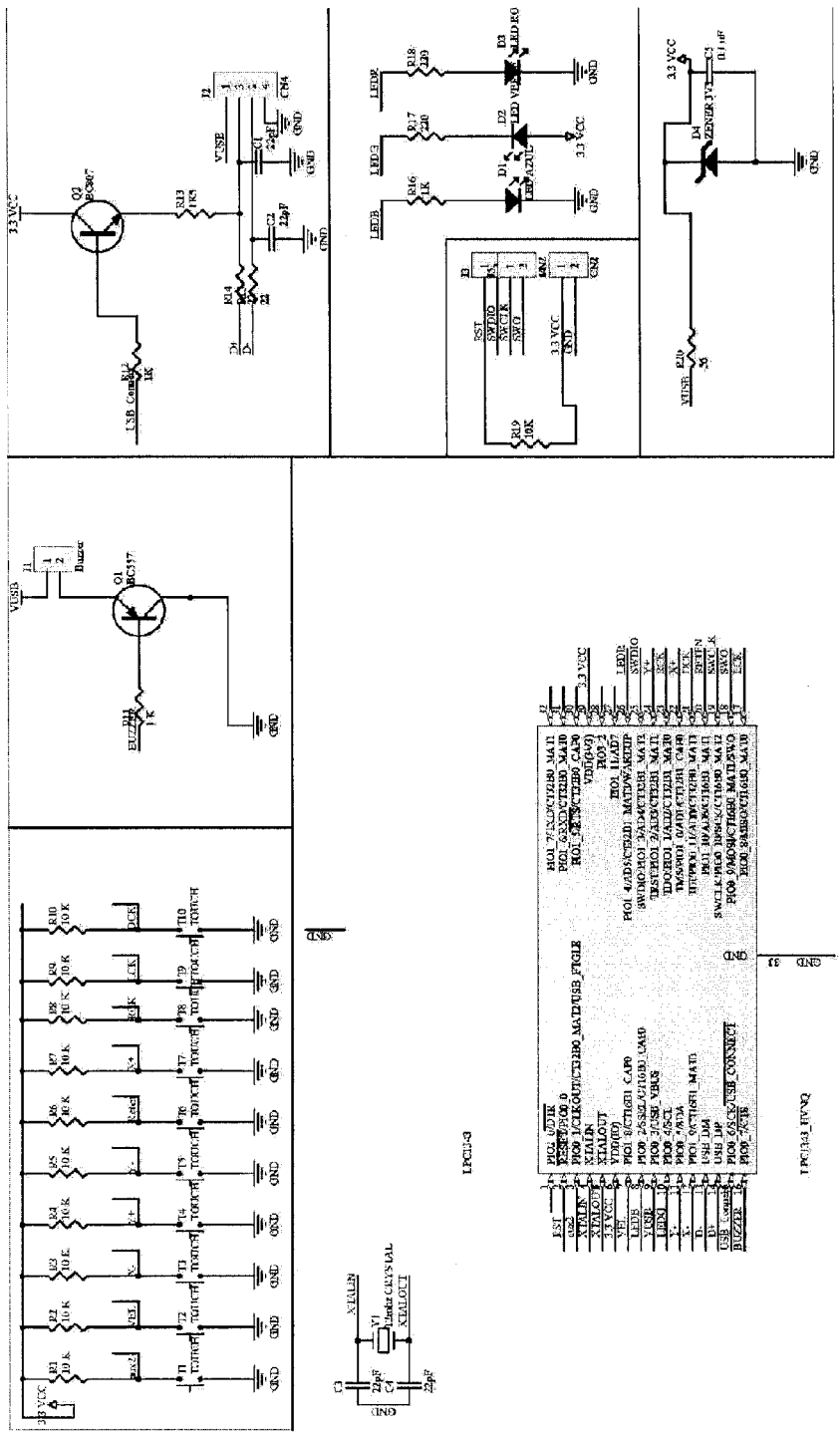
FIG. 9 illustrates a schematic diagram of the electronics circuits of a pointing device according to the preferred embodiment of the invention.

When pressing a button, the electronic circuit of the device shown in the diagram of FIG. 9 gets started. In the preferred embodiment, each button develops a specific function in the device. A general purpose MCU pin configured as an input is connected to GND. When it is not pressed, this pin remains connected to 3.3V through a pull-up resistor (R1). Depending on the pressed buttons, the MCU develops different actions according to the software (firmware) loaded in the MCU memory. All those actions are the ten abovementioned movements or functions (i.e. double click, right click, cursor movement, etc.). For the MCU operation, the circuit includes an oscillator consisting in a 12 MHz crystal (Y1) and two capacitors (C3 and C4). The three LEDs 25, 26 and 27 function as luminous signals connected to determined MCU output pins and are supplied by a current limiting resistor (R16, R17 and R18). The buzzer 24 functions as sound signal, controlled by a bipolar PNP transistor (Q4) working in a switching regime controlled by a MCU output. The USB connection is permitted by two resistors (R14 and R15) working in a series circuit to D+ and D− lines, two filter capacitors (C2 and C1) and a 1.5 KOhm 1% "pull-up" resistor (R13) necessary to perform the device enumeration. This last resistor is connected to 3.3V through a transistor (Q2) controlled by the MCU through a resistor (R12).

Figure 10:
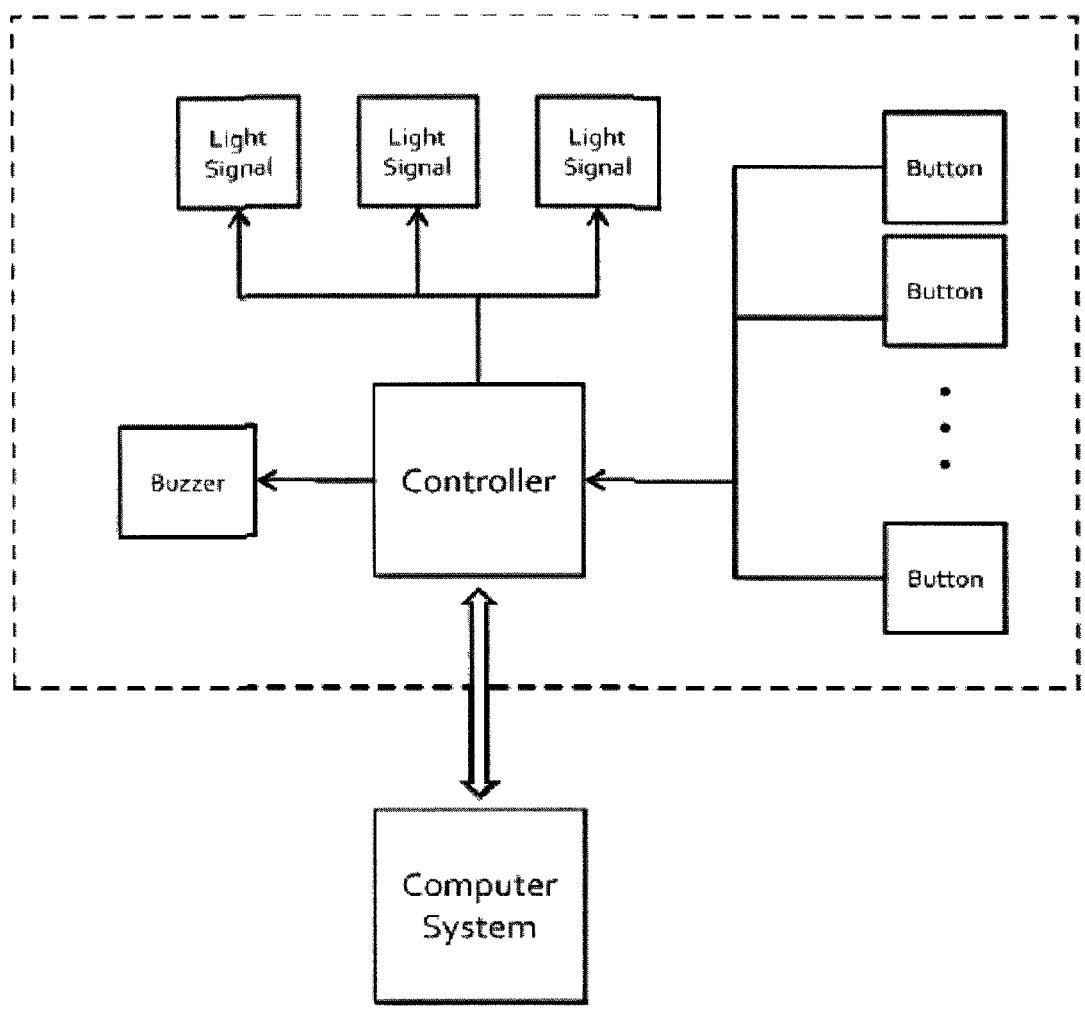
FIG. 10 illustrates a simplified block diagram of a pointing device according to the preferred embodiment of the invention.

FIG. 10 illustrates the functioning of the claimed device in a simplified manner. The preferred embodiment of the invention is a Plug&Play device, which only requires an available USB port. After plugging the cable 28, the device will be installed automatically in the desktop computer or laptop, not requiring extra software or driver. It is not necessary to remove a traditional mouse from the computer, in case there is one plugged in, since both mouses can function simultaneously. This allows the computer to be used by other people, without it being necessary for the disabled users to remove the traditional mouse every time they want to use the computer. This is another advantage of the invention over the prior art.

When it is ready to use, the red LED 26 will turn on evidencing that the device is turned on by means of the power signal 1. By pressing any directional button 2, 3, 8, 9, the cursor will move across the screen according to the chosen direction. Once the cursor is located in the desired position, the user must stop pressing the directional button. As default, the speed of the cursor will increase gradually up to reach the final configured cursor speed. This acceleration may be removed, so the cursor will start moving at the full selected speed, by holding left click button 3 pressed during two minutes. The buzzer 24 will give evidence of this by a sound signal. The user can modify the final cursor speed by pressing the speed selection button 11. This process requires the user to press the move up 2 and move down 9 buttons until the desired velocity is reached. When setting the adequate speed, the blue LED 26 and the buzzer 24 will blink and beep proportionally to the actual speed as witnesses. By pressing the speed selection button 11 the user will finish the speed setting up process.

Another advanced function provided by the preferred embodiment of the invention is the double left click function, performed with a single button 5 pressing, allowing the user with movement disorders to carry out this action without the need to make a fast complex movement. By clicking the left click hold button 6 the user can perform actions, such as "drag and drop" or multiple object selection without the need to hold the single left click button pressed while moving the pointer. Once the object is selected and dragged to the desired position using the movement buttons 2, 8, 9 or 13, the user must click again the left click hold button 6 to drop it.

Figure 11:
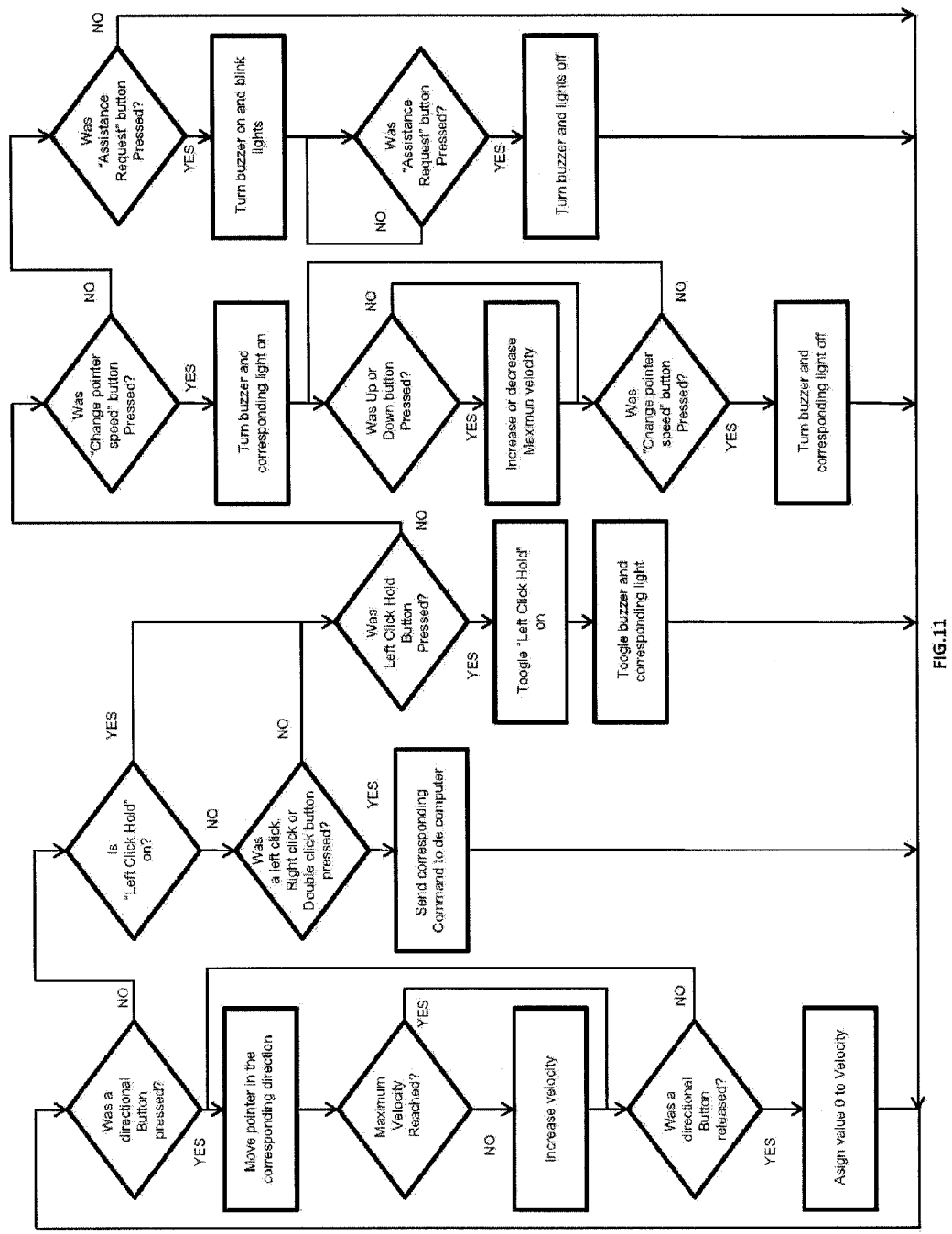
FIG. 11 illustrates a schematic block diagram showing the functional relationship of a pointing device according to the preferred embodiment of the invention.

The preferred embodiment of the invention further contains an assistance request button 12 which starts or finishes the call mode. While the call mode is active, the device emits an intermittent sound and its three light signals blink. If the user is under care assistance, it gives him the possibility of requesting assistance directly from the pointing device, without it being necessary to use external devices, such as phones, bells, nurse-call buttons, etc. The abovementioned functioning as regards the buttons and their corresponding features can be clearly seen in the diagram block shown in FIG. 11.

Those skilled in the art will recognize that numerous modifications and changes may be made to the described embodiment without departing from the scope of the claimed invention. It will, of course, be understood that modifications of the invention, in its various aspects, will be apparent to those skilled in the art, some being apparent only after study, others being matters of routine mechanical and electronic design. No single feature, functions or property of the preferred embodiment is essential. Other embodiments are possible, their specific designs depending upon the particular application. As such, the scope of the invention should not be limited by the preferred embodiment herein described but should be defined only by the appended claims and equivalents thereof.

The invention claimed is:

1. A computer mouse oriented to disabled people or people with movement disorders, comprising:
   a housing comprising two separate parts assembled with each other,
   a series of different colored buttons arranged according to their functions, wherein said buttons are in a depressed surface and surrounded by restraining walls, wherein at least one button restraining wall arises from a high-relief surface,
   a flexible hard-use film containing all button symbols printed thereon,
   a filler rubber, and
   a printed circuit board,
   wherein at least one separator, including a micro-porous rubber separator to support pressure exerted from fingers of a user, is arranged between one of the housing parts and the printed circuit board,
   wherein the at least one separator includes three additional hard rubber separators to prevent accidental pushing of any of the buttons caused by a torsion provoked by an unintentional pressing of the housing, wherein the three additional hard rubber separators are arranged between one of the housing parts and the printed circuit board.

2. The computer mouse of claim 1, wherein said high-relief surface comprises at least one tactile groove.

3. The computer mouse of claim 1, wherein all the buttons comprise a tact switch below them.

4. The computer mouse of claim 1, comprising an inclination degree provided by a hollow back support protruding from the housing.

5. The computer mouse of claim 1, wherein the printed circuit board comprises sound and light devices.

6. The computer mouse of claim 1, wherein all the buttons operate in such a way that a user can employ all functions of the computer mouse by pressing or clicking just once said buttons.

* * * * *